(12) United States Patent  (10) Patent No.: US 7,561,775 B2
Lin et al.  (45) Date of Patent: Jul. 14, 2009

(54) FIBER OPTIC PROTECTIVE SHUTTER

(75) Inventors: Samuel I. En Lin, Chu-Nan Town (TW); Stephen O'Riorden, Stow, MA (US)

(73) Assignee: Senko Advanced Components, Inc., Marlboro, MA (US)

( * ) Notice: Subject to any disclaimer, the term of this patent is extended or adjusted under 35 U.S.C. 154(b) by 0 days.

(21) Appl. No.: 11/937,141

(22) Filed: Nov. 8, 2007

(65) Prior Publication Data

US 2008/0101757 A1  May 1, 2008

Related U.S. Application Data

(63) Continuation-in-part of application No. 11/508,446, filed on Aug. 22, 2006, now Pat. No. 7,315,682.

(60) Provisional application No. 60/944,926, filed on Jun. 19, 2007.

(51) Int. Cl.
G02B 6/36 (2006.01)
G02B 6/38 (2006.01)
G02B 6/00 (2006.01)

(52) U.S. Cl. .......................... 385/139; 385/55; 385/56; 385/58; 385/75; 385/76; 385/77; 385/134

(58) Field of Classification Search .................. 385/139
See application file for complete search history.

(56) References Cited

U.S. PATENT DOCUMENTS

| 5,348,487 | A | * | 9/1994 | Marazzi et al. | 439/138 |
|---|---|---|---|---|---|
| 5,506,922 | A | | 4/1996 | Grois et al. | |
| 5,570,445 | A | * | 10/1996 | Chou et al. | 385/92 |
| 5,687,268 | A | * | 11/1997 | Stephenson et al. | 385/73 |
| 5,956,444 | A | | 9/1999 | Duda et al. | |
| 6,206,577 | B1 | | 3/2001 | Hall, III et al. | |
| 6,247,849 | B1 | | 6/2001 | Liu et al. | |
| 6,461,054 | B1 | | 10/2002 | Iwase | |
| 2004/0052473 | A1 | | 3/2004 | Seo et al. | |

* cited by examiner

*Primary Examiner*—Frank G Font
*Assistant Examiner*—Ryan Lepisto
(74) *Attorney, Agent, or Firm*—Pepper Hamilton LLP

(57) ABSTRACT

A protection system for a fiber optic coupling having a first housing with a guide slot in a side wall includes a protective cap with a slot in a side wall and defining a passage for receiving the first housing whereby the protective cap slot aligns with the guide slot in the first housing and a protective shutter pivotally connected to the protective cap for covering a distal end of the fiber optic coupling.

2 Claims, 5 Drawing Sheets

FIBER OPTIC PROTECTIVE SHUTTER

RELATED APPLICATIONS

This application claims priority to U.S. Provisional Application No. 60/944,926, filed Jun. 19, 2007 and entitled, "Fiber Optic Protective Shutter," which is herein incorporated by reference. This application is a continuation-in-part of U.S. patent application Ser. No. 11/508,446, filed Aug. 22, 2006 now U.S. Pat. No. 7,315,682 and of the same title, which application has been allowed, and which application is herein incorporated by reference.

BACKGROUND OF THE INVENTION

In the optical fiber field, light-guide fibers are used in optical transmission systems wherein the fibers are connected end-to-end to transfer light or optical energy. Often, fiber ends may be damaged by adverse environmental hazards, particularly at the location where optical fibers terminate in connectors. In particular, dust, dirt, and debris may impair the optical transmission capabilities of the fiber. Also, since a laser beam passes through the fiber, an operator's eyes may easily be injured while the connector is not in use or is not covered. Hence, the mating end of a fiber connector is often covered when not in use or not connected.

SUMMARY OF THE INVENTION

In general, in an aspect, the invention is directed to a protection system for a fiber optic coupling, the fiber optic coupling having a first housing with a guide slot in a side wall. The system includes a protective cap including a slot in a side wall and defining a passage for receiving the first housing whereby the protective cap slot aligns with the guide slot in the first housing, and a protective shutter pivotally connected to the protective cap for covering a distal end of the fiber optic coupling. The protective shutter can be configured to attenuate electromagnetic radiation in at least one of the near infrared range or the infrared range.

In general, in another aspect, the invention is directed to a protective shutter for a fiber optic coupler to prevent dust and other contaminants from entering the coupler. The shutter includes a protective cap configured to protect fibers in a fiber optic connection, and a lid pivotally connected to a protective cap. The protective shutter can be configured to attenuate electromagnetic radiation in at least one of the near infrared range or the infrared range.

Various aspects of the invention may provide one or more of the following capabilities. A protective shutter for a fiber optic connector that attenuates electromagnetic radiation and prevents dust and other contaminants from entering the connector may be provided. Foreign matter is substantially prevented from entering the housing. Guiding slots in the walls of the connector increase the ease with which the protective cover and the fiber coupler are connected. Ease of disassembly of the protective cap from a coupler is improved.

These and other capabilities of the invention, along with the invention itself, will be more fully understood after a review of the following figures, detailed description, and claims.

DETAILED DESCRIPTION OF PREFERRED EMBODIMENTS

Embodiments of the invention provide products and techniques for protecting a fiber optic coupler from contamination by dust, debris or other environmental hazards. Exemplary embodiments of the invention include a protective cap and a protective shutter. The protective cap includes an open slot in the side that aligns with a guiding slot in the fiber coupler. The movable shutter covers the receiving recess in the protective cap and coupler, thereby preventing contamination from entering the coupler. The open slot in the side of the cap allows the user to remove the cap after it has been placed on the fiber coupler. The cap is slid off the coupler by inserting a tool in the slot and prying apart. The protective cap is configured to slide onto the fiber coupler for connection. Other embodiments are within the scope of the invention.

Figure 1:
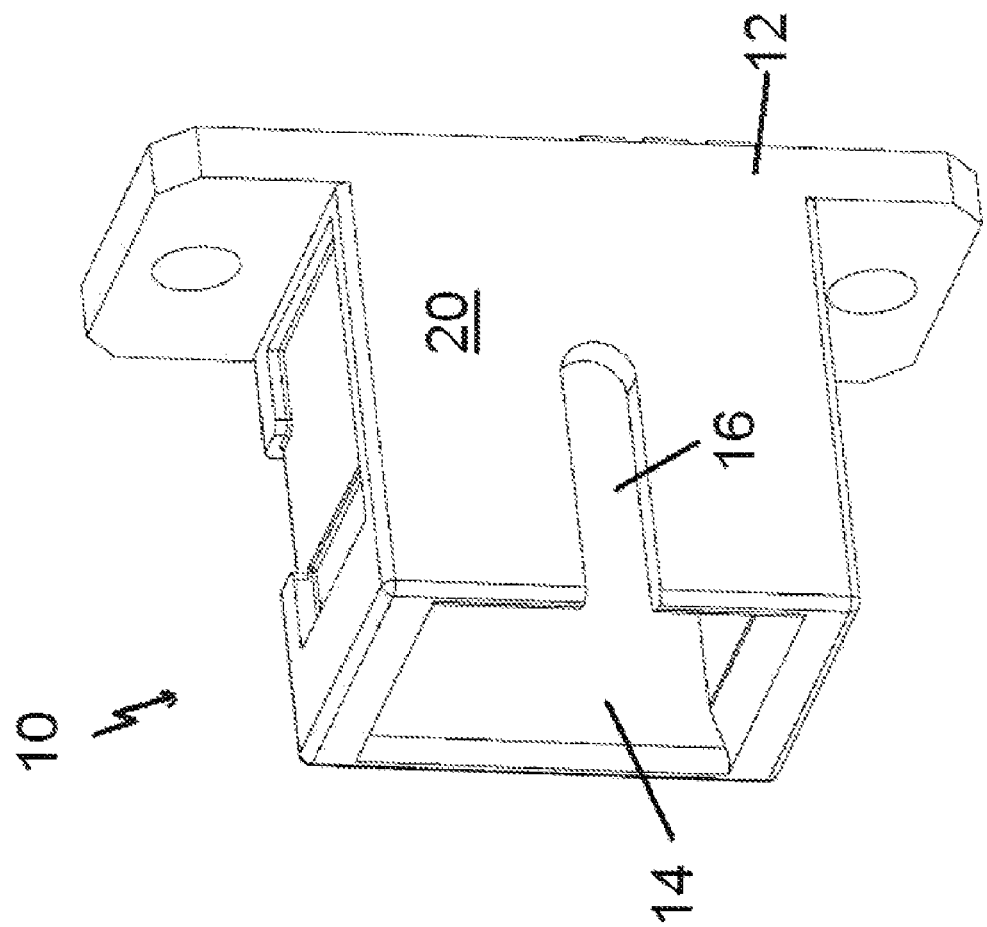
FIG. 1 is an exploded, perspective view of a fiber coupler.

Referring to FIG. 1, a fiber optic coupler 10 includes a body 12 having a recess 14 and a guide slot 16. The recess 14 is configured to receive fiber optic cables when the cables are inserted for connection. The recess 14 comprises a center bore, or axial passageway through the first coupler 10. The receiving recess 23 optically connects a fiber bundle. The guide slot 16 is positioned in a sidewall 20 of the coupler 10 and is configured to assist in the connection of the coupler 10 to a protective cover. The fiber coupler 10 may include a first housing and a second housing. The second housing can be a mirror image of the first housing positioned to connect to the first housing.

Figure 2:
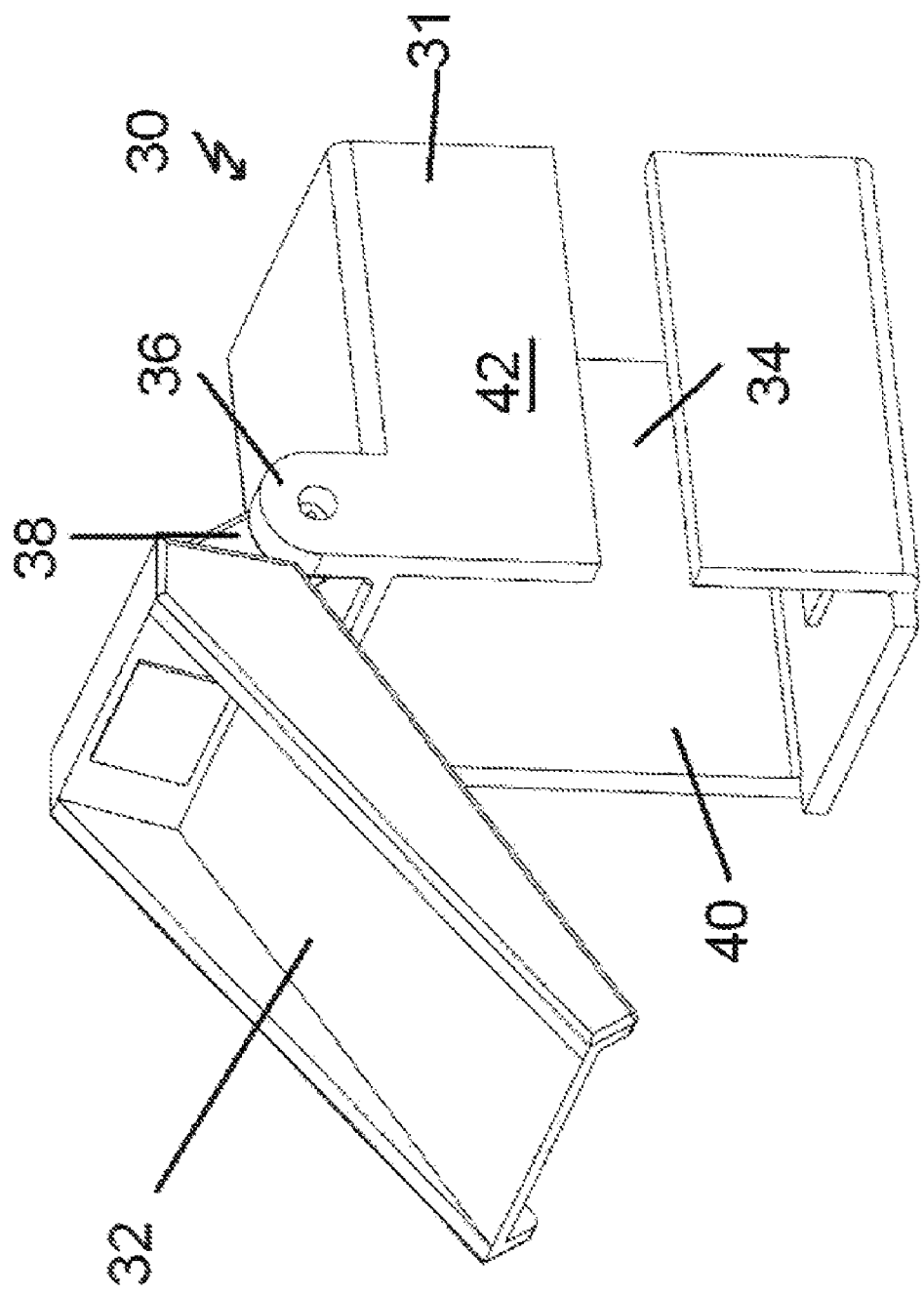
FIG. 2 is an exploded, perspective view of a protective cap for use on a fiber coupler.

Referring also to FIG. 2, a protective cap or cover 30 for the fiber coupler 10 includes a body 31 shutter 32, a guide slot 34, pivot connectors 36, pivot arms 38 and a receiving recess 40. The guide slot 34 is positioned in a sidewall 42 of the protective cover 30. The shutter 32 is pivotally connected to the body 31 using pivot arms 38 that connect to pivot connectors 36 of the body 31. The shutter 32 is configured to open and close via the pivot arms 38. The pivot connection, for example, is located on a distal end of the protective cap 30. The protective shutter 32 pivots about the axis of the pivot connection from an open position to a closed position, in which the protective shutter 32 covers the passage or receiving recess 40 of the protective cap or cover 32. The protective shutter 32 is configured to pivot to an open position in which the passage 40 is not covered. In an alternative embodiment, the protective shutter 32 is connected to the protective cap 30 via a horizontal or vertical slide movable connection. Other known means of connection are possible. The receiving recess 40 of the protective cap or cover 30 is configured to align with the receiving recess 14 of the fiber coupler 10 and receive fiber. The guide slot 34 is configured to substantially align with the guide slot 16 of the fiber coupler 10 when the protective cover 30 is positioned onto the fiber coupler 10. The guide slot 34 can be, for example, positioned along a horizontal width of the protective cap or cover 30, substantially midway between the top and bottom edges of the protective cap 30.

The protective shutter 32 is made of a material that attenuates electromagnetic radiation in the near IR and IR range. Conventional plastics used for protective caps may attenuate electromagnetic radiation (EM) in the visible range but may not attenuate EM in the IR and Near IR range (e.g., in the range of approximately 780 nm to 3000 nm). This near IR and IR EM cannot be seen by the human eye, but can still do considerable damage. Therefore, attenuation in this range can be crucial to true eye safety. The material properties of the cap are such that the polymers either provide adequate attenuation of electromagnetic radiation or the polymers are mixed with a material that will scatter and/or attenuate any potential radiation emitted from a "live" connector plugged into the housing. Such materials, for example, may include but are not limited to 30% glass filled Polyethylene Terephthalate (PET), thermoplastics with modest levels of carbon black filler, or various Near Infrared (NIR) absorbers that are made of highly absorbent, non-reflecting material. The emitted radiation can be reduced to a level lower than the Maximum Permissible Exposure (MPE) limits for biological effects so as to limit any ocular damage that may otherwise occur while using a shutter with poor attenuation properties.

Figure 3:
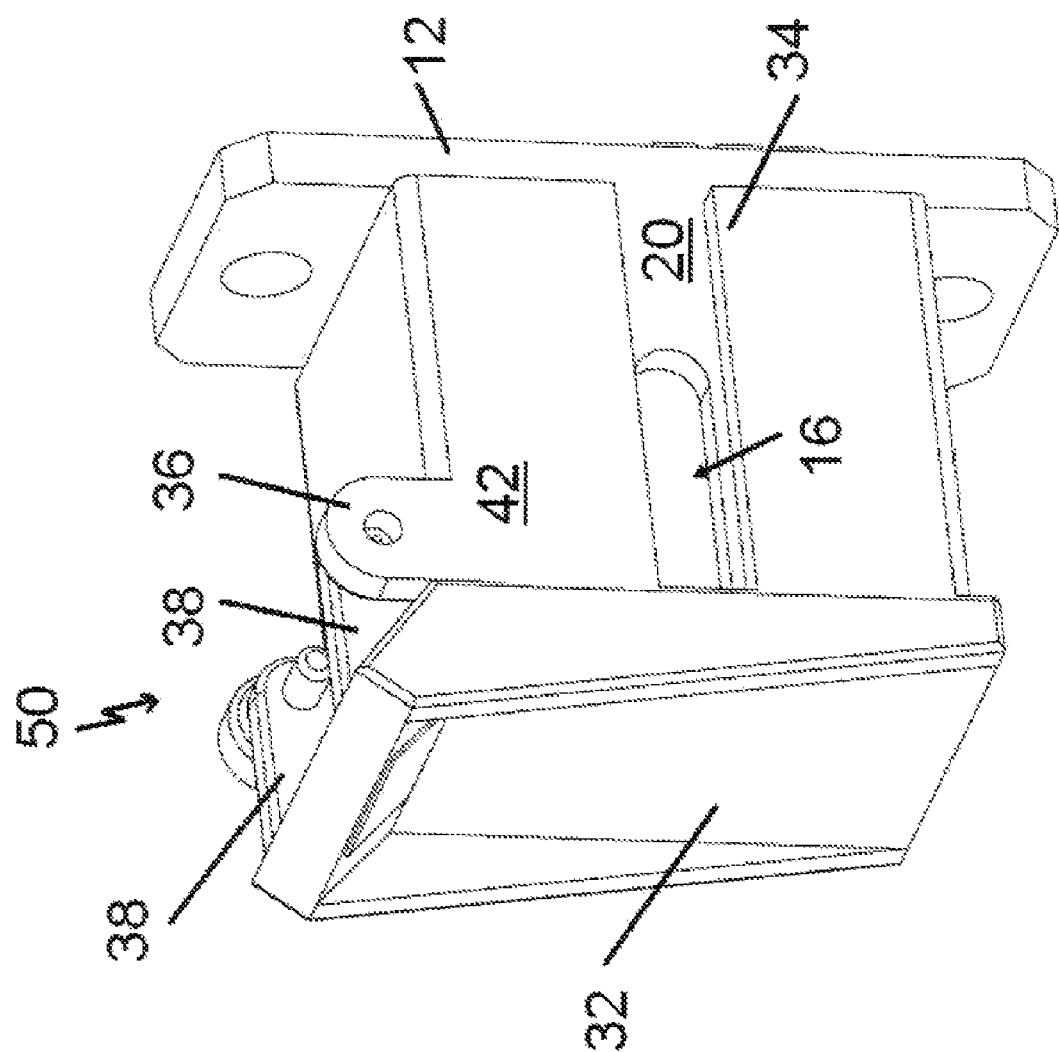
FIG. 3 is an assembled, perspective view of a fiber coupler on which the protective cap is mounted.

Referring also to FIG. 3, a coupling protection system 50 includes the protective cap 30 and the fiber coupler 10. The housing of the fiber coupler 10 is inserted into the passage 40 of the protective cap 30. The protective cap 30 slides over the body 12 of the coupler 10, inserting axially into the passage 40. The coupler 10 is inserted into the protective cap or cover 30 on a side opposite the distal end of the protective cap or cover 30 to which the protective shutter 32 is attached. The coupler 10 is inserted into the protective cap 30 in an orientation such that the guide slot 34 of the protective cap 30 substantially aligns with the guide slot 16 in the coupler 10. The protective cap 30 remains in place over the coupler 10 through the use of contact friction and/or the use of snap tabs and recesses molded into the protective cap 30 and the coupler 10 respectively. Preferably, the protective cap or cover 30 is retained in a position on the coupler 10 by contact friction. Other known means of retaining the coupler 10 in the cap 30 are possible and envisioned.

Figure 4:
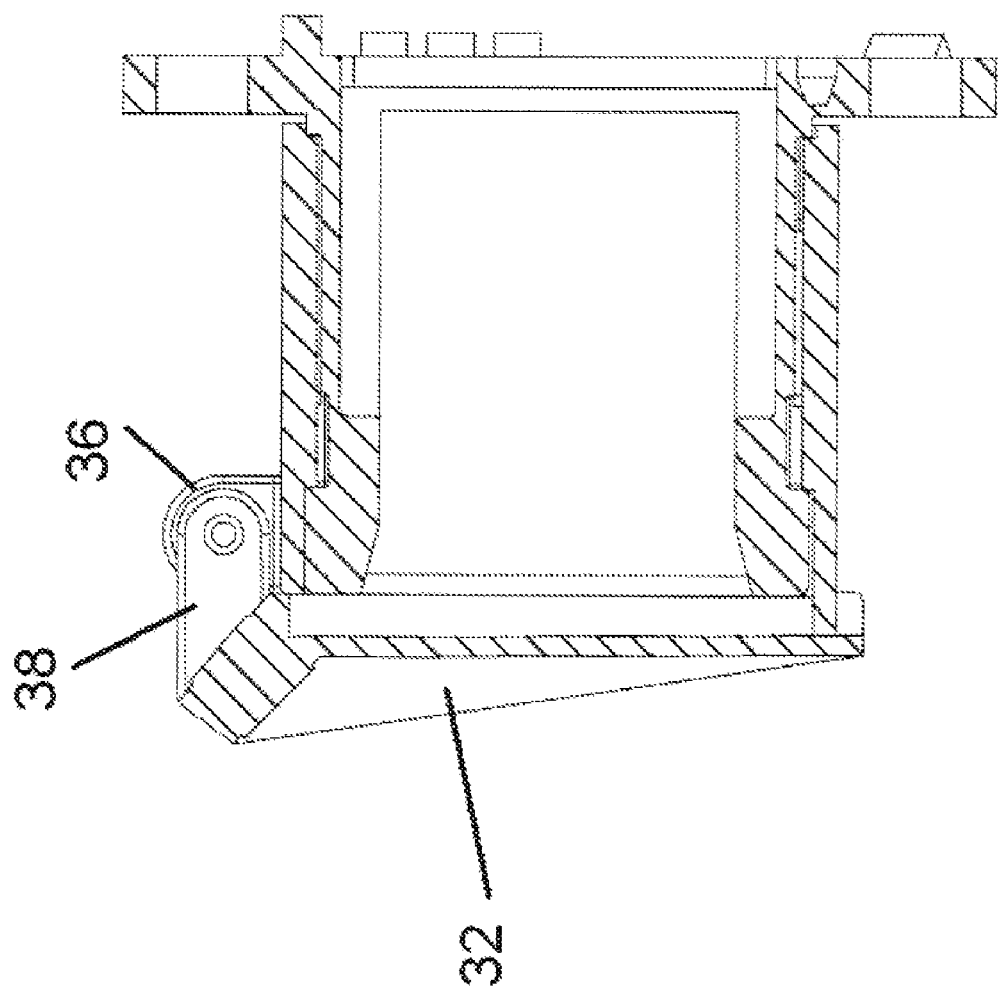
FIG. 4 is a side perspective cutaway view of a fiber coupler on which the protective cap is mounted.
Figure 5:
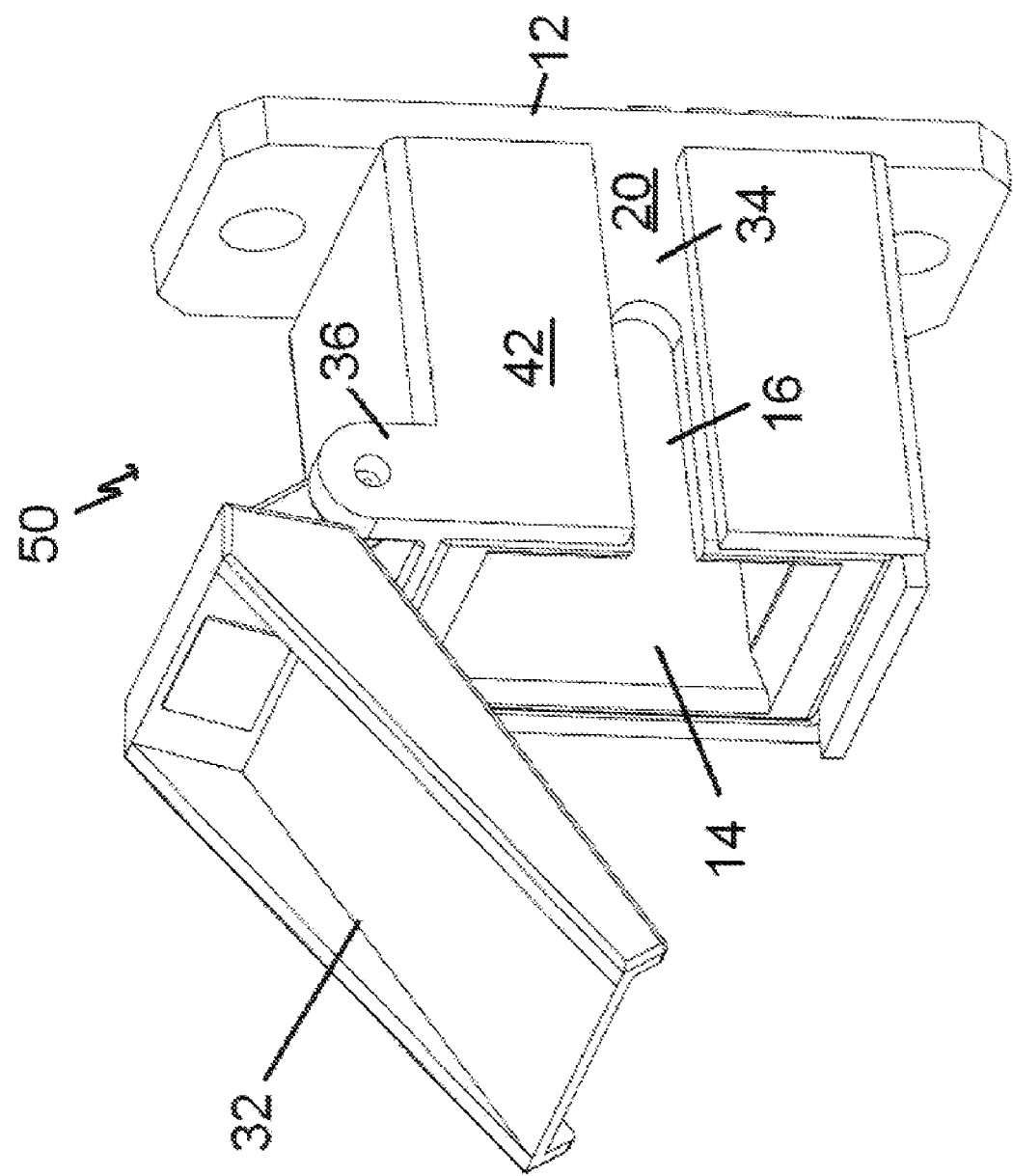
FIG. 5 is an assembled, perspective view of a fiber coupler on which the protective cap is mounted and in an open position.

Referring also to FIG. 4 and FIG. 5, the fiber optic coupling protection system 50 is assembled axially over the fiber coupler 26. When the system 50 is assembled, the receiving recess 14 is covered by the protective shutter 32. The shutter 32 can be opened for insertion of a fiber connector into the receiving recess 14. The protective shutter 32 is pivoted to an open position about the pivot connection which is connected to the distal end of the protective cap 30 and to the top edge of the shutter 32, until the protective shutter 32 no longer obstructs the receiving recess 14. If the fiber connector is removed, the protective shutter 32 resumes its closed position in which the shutter 32 covers the receiving recess 14 by pivoting about the pivot connection. The force required to pivot the protective shutter 32 to a closed position may be generated from many various sources, such as a spring attached to the pivot connection and configured to return the protective shutter 32 to the closed position, for example. The open guide slot 34 that is aligned with the coupler 10 guide slot 16 in the side of the cap 30 allows the user to remove the cap 30 when it is positioned on the fiber coupler 10. The cap 30 is easily slid off the coupler 10 by inserting a tool in the slot and prying apart. Thus, the defects of a conventional protective cap are overcome while providing protection from environmental hazards. The system 50, is exemplary only and not limiting as other system configurations can be used with embodiments of the invention.

Other embodiments are within the scope and spirit of the appended claims. Features implementing functions may also be physically located at various positions, including being distributed such that portions of functions are implemented at different physical locations. Further, while the description above refers to the invention, more than one invention may be described.

The invention claimed is:

1. A protection system for a fiber optic coupling, the fiber optic coupling having a first housing with a guide slot in a side wait the system comprising:

a protective cap including a slot in a side wall and defining a passage for receiving the first housing whereby the protective cap slot aligns with the guide slot in the first housing; and a protective shutter pivotally connected to the protective cap and configured to cover a distal end of the first housing of the fiber optic coupling.

2. The protection system of claim 1, wherein the protective shutter is configured to attenuate electromagnetic radiation in at least one of the near infrared range or the infrared range.

* * * * *